(12) United States Patent
Molsen et al.

(10) Patent No.: US 7,791,694 B2
(45) Date of Patent: Sep. 7, 2010

(54) TRANSFLECTIVE LIQUID CRYSTAL DISPLAYS WITH SEQUENTIALLY FLASHING LIGHT SOURCES

(75) Inventors: Henning Molsen, Lueneburg (DE); Martin David Tillin, Oxfordshire (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/243,555

(22) Filed: Oct. 1, 2008

(65) Prior Publication Data

US 2009/0033837 A1 Feb. 5, 2009

Related U.S. Application Data

(63) Continuation of application No. 09/787,594, filed as application No. PCT/JP99/05210 on Sep. 22, 1999, now abandoned.

(30) Foreign Application Priority Data

Sep. 22, 1998 (GB) ................................ 9820516.4

(51) Int. Cl.
*G02F 1/1335* (2006.01)
*G09G 3/36* (2006.01)
(52) U.S. Cl. ...................... 349/114; 349/113; 349/106; 345/88
(58) Field of Classification Search .................. 349/96, 349/113–114
See application file for complete search history.

(56) References Cited

U.S. PATENT DOCUMENTS

| 4,315,258 | A |   | 2/1982 | McKnight et al. |
|---|---|---|---|---|
| 4,398,805 | A |   | 8/1983 | Cole |
| 5,347,378 | A | * | 9/1994 | Handschy et al. ............. 349/78 |
| 5,428,366 | A | * | 6/1995 | Eichenlaub .................. 345/102 |
| 5,510,915 | A |   | 4/1996 | Ge et al. |
| 5,654,780 | A | * | 8/1997 | Hasegawa et al. ........... 349/136 |
| 5,699,137 | A |   | 12/1997 | Kishimoto |
| 5,753,937 | A | * | 5/1998 | Shimomaki et al. ........... 257/59 |
| 5,949,507 | A | * | 9/1999 | Shimada et al. ............. 349/113 |
| 6,046,786 | A |   | 4/2000 | Sharp et al. |
| 6,195,140 | B1 | * | 2/2001 | Kubo et al. .................... 349/44 |
| 6,232,937 | B1 |   | 5/2001 | Jacobsen et al. |

(Continued)

FOREIGN PATENT DOCUMENTS

EP 0 342 835 11/1989

(Continued)

OTHER PUBLICATIONS

International Search Report for corresponding Application No. PCT/JP99/05210 mailed May 5, 2000.

*Primary Examiner*—Hoan C Nguyen
(74) *Attorney, Agent, or Firm*—Renner, Otto, Boisselle & Sklar, LLP

(57) ABSTRACT

A transflective liquid crystal display (70) comprises a liquid crystal cell (38) disposed between a front substrate (40) and a rear substrate (36), a front polarizer (46) located in front of the front substrate (40) and a rear polarizer (32) located behind the rear substrate (36), a front retarder (42, 44) located between the front substrate (40) and the front polarizer (46), a rear retarder (62, 64) located between the rear substrate (36) and the rear polarizer (32), and a light source (30) located behind the rear polarizer (32). A transflective display having a number of differently colored sequentially flashing backlights is also provided.

19 Claims, 12 Drawing Sheets

U.S. PATENT DOCUMENTS

| | | |
|---|---|---|
| 6,285,422 B1 | 9/2001 | Maeda et al. |
| 6,295,109 B1 * | 9/2001 | Kubo et al. .................. 349/119 |
| 6,646,702 B1 | 11/2003 | Motomura et al. |
| 2005/0051112 A1 * | 3/2005 | Van Berlo ................... 122/466 |

FOREIGN PATENT DOCUMENTS

| | | |
|---|---|---|
| EP | 0 487 359 | 5/1992 |
| EP | 0 699 938 | 3/1996 |
| GB | 2 101 347 | 1/1983 |
| JP | 4-194820 | 7/1992 |
| JP | 8-76148 | 3/1996 |
| JP | 9-101515 | 4/1997 |
| JP | 11-101992 | 4/1999 |

\* cited by examiner

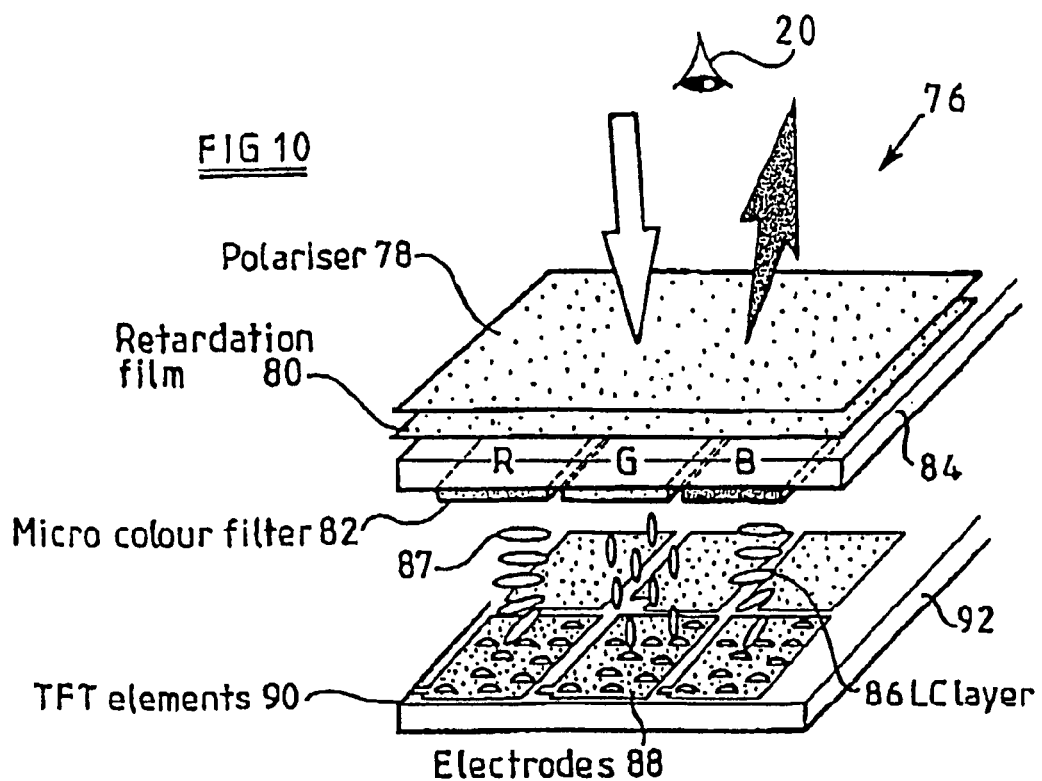
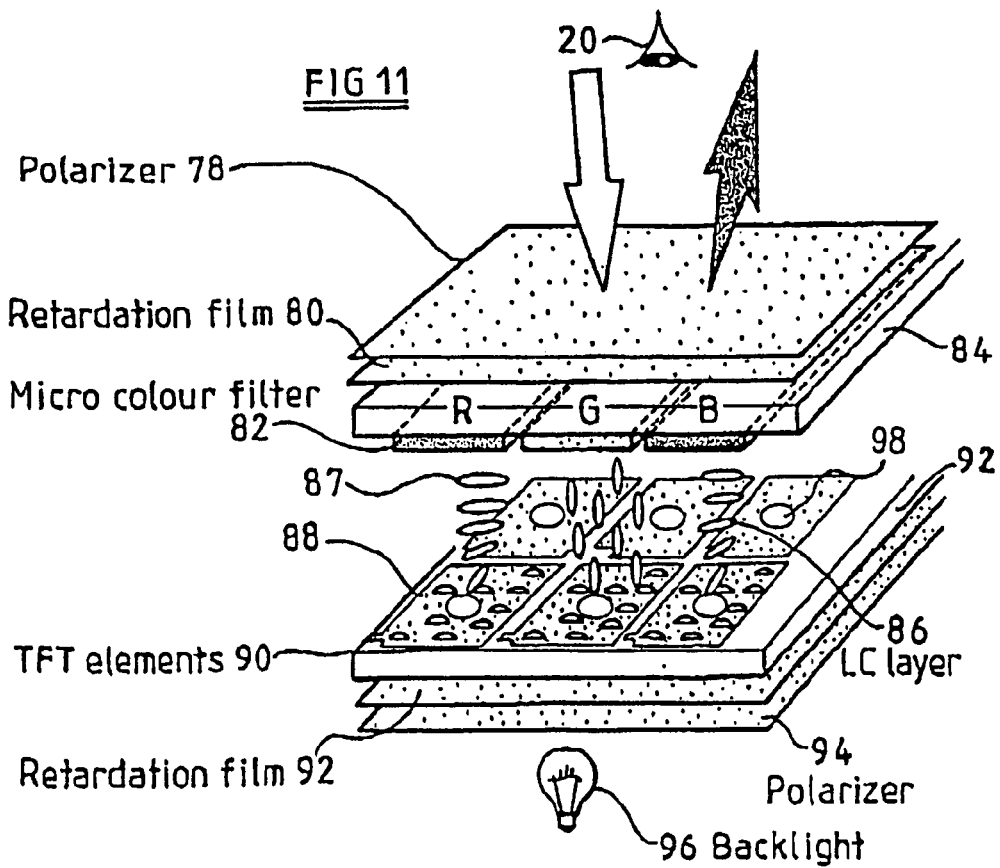

TRANSFLECTIVE LIQUID CRYSTAL DISPLAYS WITH SEQUENTIALLY FLASHING LIGHT SOURCES

This application is a continuation of U.S. patent application Ser. No. 09/787,594 filed Jun. 25, 2001 now abandoned, which is a §371 of International Application No. PCT/JP99/05210 filed Sep. 22, 1999, which claims priority to GB 9820516.4 filed Sep. 22, 1998, the entire disclosures of which are incorporated herein by reference.

TECHNICAL FIELD

The invention relates to transflective liquid crystal displays, which rely for their operation on reflection of ambient light, and transmission of light from a backlight in the case of a low ambient light level to achieve excellent readability in all lighting conditions.

BACKGROUND ART

European Patent Publication No. 0,840,160 A2 describes a Pancharatnam-type achromatic (ie, independent of frequency/colour) reflective liquid crystal display (LCD) using a twisted nematic liquid crystal (LC) layer as part of a switchable achromatic retarder.

British Patent Application No. 9806566.7 describes an improved retarder combination for an achromatic fixed retarder and twisted nematic (TN) LC used in high resolution thin film transistor (HR-TFT) displays, which reduces threshold voltage and chromaticity and improves contrast.

S. Fujiwara et al. "Proceedings of the Fourth International Display Workshops", Nagoya 1997, (IDW '97), p. 879 describes a reflective LCD using an achromatic fixed retarder between a linear polariser and a twisted nematic LC. This is used in the HR-TFT LCD product produced by Sharp.

Solutions for converting linear polarised light to circular polarised light by a twisted nematic layer with respect to the LC parameters retardation, twist and alignment orientation can be found in Beynon et al., Proceedings of the International Display research Conference, 1997 L34.

U.S. Pat. No. 5,361,151 (Sonehara) describes a transflective LCD comprising a TN-LC layer, an internal or external semi-reflector, and chromatic retardation plates between the LC and the front and rear linear polariser.

U.S. Pat. No. 4,093,356 (J. E. Bigelow) describes a transflective liquid crystal display capable of presenting viewable indicia to an observer positioned at the front thereof. which is responsive to either reflection of incident ambient light entering into the display from the front thereof, or transmission of light from a source behind the display, and which utilises a reflective display of the type having a nematic liquid crystal host-guest dichroic dye cell backed by a quarterwave plate and partially reflective, partially transmissive transflector member, in conjunction with a linear polariser and a second quarterwave plate arranged between the backlighting source and the partially transmissive member.

In such a guest-host cell, the dichroic dye is regarded as a guest in the liquid crystal, because the orientation of the dichroic dye molecules simply follows that of the LC molecules. The dye molecules are generally transparent when viewed along their long axes, and opaque (ie. they absorb visible light) when viewed perpendicular to their long axes, and are hence referred to as dichroic. Consequently, by applying a voltage to the LC cell, the degree of absorption in the cell can be controlled, and the cell is therefore sometimes referred to as operating in an absorption mode.

The rear quarterwave plate is used to compensate for the front quarterwave plate so that linear polarised light impinges on the guest-host liquid crystal (GH-LC).

U.S. Pat. No. 4,315,258 (McKnight et al.) describes a visual display which has an increased readout capability due to its operation in a transflective mode. A source of ambient light and light for radiation through the display from the back together assure the increased readout capability. Previously, ambient light would degrade or wash-out the display making it nearly impossible for monitoring personnel to decipher alphanumeric or pictoral displays due to the decreased contrast. A pair of linear polarizers sandwich a twisted nematic liquid crystal and have their polarisation axes either parallel or mutually orthogonally disposed so that the crystal presents bright or dark areas in response to applied potentials. Because a partially transmitting mirror is interposed between the sandwiched liquid crystal and the radiating light source, the ambient light augments the radiated light to enhance the visual display. It should be understood that, throughout this specification, references to retardation values should be understood as effective retardation values, taking into account the twist angle of the retarder. A twisted birefringent structure (such as a TNLC) has a retardation of thickness×birefringence for a particular wavelength However, it effects a retardation which is lower or higher depending on the twist angle.

DISCLOSURE OF INVENTION

According to a first aspect of the invention there is provided a transflective liquid crystal display comprising a liquid crystal cell disposed between a front substrate and a rear substrate, a front achromatic retarder located in front of the front substrate and a rear polariser located behind the rear substrate, a front retarder located between the front substrate and the front polariser, a rear retarder located between the rear substrate and the rear polariser, a light source located behind the rear polariser, and a partially transparent/partially reflective layer (for example a semi-transparent mirror, transflector) between the liquid crystal layer and said light source.

This allows the display to benefit from backlighting in low ambient light conditions and high contrast while still providing the benefits of an achromatic reflective display.

The front retarder may comprise a front halfwave plate and a front quarterwave plate.

The front quarterwave plate may have a retardation of between 0 nm and 250 nm.

The front halfwave plate may have a retardation of between 200 nm and 360 nm.

The rear retarder may comprise a rear quarterwave plate.

The rear quarterwave plate nay have a retardation of between 100 nm and 180 nm, and preferably of substantially 135 nm.

The rear substrate may be provided with a partially reflective and partially transmissive mirror.

The liquid crystal cell may be provided with a rear electrode, which is partially reflective and partially transmissive.

The rear retarder may further comprise a rear halfwave plate.

The rear halfwave plate may have a retardation of between 200 nm and 360 nm.

The rear halfwave plate may be located between the rear quarterwave plate and the rear polariser.

In order to use the same LC profile and thickness and the same operating mode (normally white) for reflective and transmissive modes of operation, the backlight can be manipulated first by a linear polariser followed by a quarter wave plate at 45° to the polarisation or absorption direction.

The invention broadens the usability of reflective LCDs by incorporating a backlight. This is achieved without major alteration to the existing HR-TFT fabrication process. As compared with front lighting systems the contrast ratio of the LCD using a backlight is not reduced. Although the transmission may be only 50% of the ideal value this is not critical to the readability of the LCD as the backlight will only be operated at low ambient light levels. The invention can also operate in normally black mode either in both transmission and reflection or transmission by changing the azimuth angle of both polarisers by 45° in the same direction.

The process flow to manufacture the internal reflector in the HR-TFT requires only one additional step. To secure uniform electric fields the etched window in the aluminium can be sputter-coated with indium tin oxide (ITO) in a self-aligning process. Surplus ITO on the photoresist used to pattern the aluminium mirror can be removed during the photoresist development or removal/strip. Multiple windows can be randomly distributed over the pixel to avoid diffraction.

Alternatively, the reflective layers can be thinned to an extent that it becomes partially transmissive to a predetermined value over the whole or part of the pixel electrode.

According to a second aspect of the invention, there is provided a transflective display comprising a liquid crystal divided into a plurality of pixels, addressing means for addressing each pixel and switching each pixel between different states resulting indifferent levels of transmission of light through the display, a flashing backlight located behind the liquid crystal, and a partially transparent/partially reflective layer (for example a semi-transparent mirror, transflector) between the liquid crystal layer and said flashing backlight for both reflecting ambient light back through the liquid crystal and allowing transmission of light from the backlight through the liquid crystal, wherein each pixel is provided with a light filter, and wherein the backlight comprises a plurality of sequentially flashing light sources.

In one embodiment, of the invention, each light filter is a colour light filter, and said sequentially flashing light sources are of different colours.

Said liquid crystal may be part of an active matrix display.

In one embodiment, the liquid crystal forms a Pi or optically compensated birefringent (OCB) cell.

In a further embodiment, each light source is a light emitting diode (LED).

Each colour filter may provide a varying level of absorption across its area.

Each colour filter may have a transparent region.

This provides the advantage of ensuring that a greater amount of light from each light source can pass through every colour filter.

In this case, said liquid crystal may be provided with a plurality of partially reflective electrodes each having a light transmissive area, and each transmissive area may be optically aligned with a transparent region of one of said colour filters.

The transflective display of the second aspect of the invention may also have any or all of the features of the transflective display of the first aspect of the invention.

BRIEF DESCRIPTION OF DRAWINGS

The invention will now be more particularly described, by way of example only, with reference to the accompanying drawings, in which:

FIG. 10 is a schematic diagram of the prior art pixellated reflective LCD with internal reflectors described in the Fujiwara reference mentioned above;

FIG. 11 is a schematic diagram of a pixellated transflective LCD with internal reflectors and a transmission window in accordance with the invention.

BEST MODE FOR CARRYING OUT THE INVENTION

Figure 1:
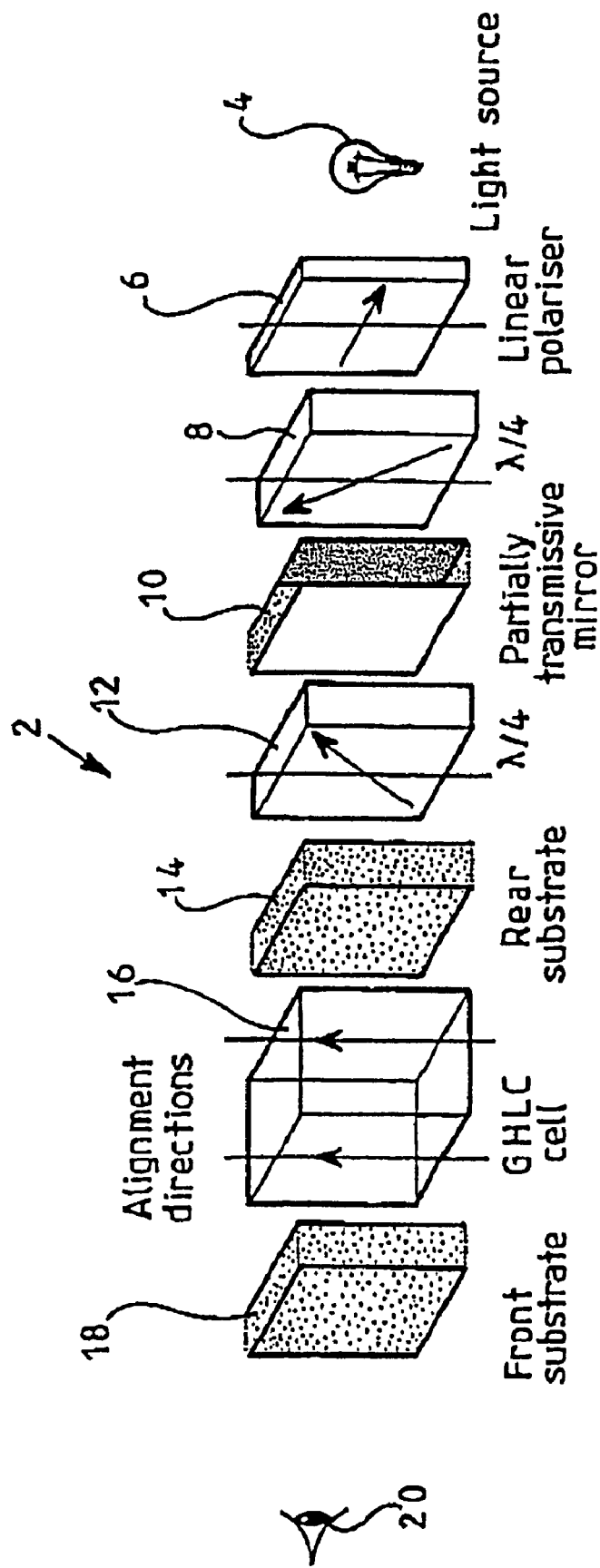
FIG. 1 shows the arrangement described in U.S. Pat. No. 4,093,356 (mentioned above), which uses a quarterwave plate between a rear polariser and a reflector in a transflective GH LCD.

The prior art transflective guest-host (GH) LCD 2 shown in FIG. 1 comprises a light source 4, linear polariser 6, first quarterwave plate 8, partially transmissive mirror 10, second quarterwave plate 12, rear substrate 14, guest-host liquid crystal (GH-LC) cell 16, and front substrate 18.

The quarterwave plates (or retarders) 8 and 12 and the linear polariser 6 are formed from stretched polymer films. The GH-LC cell 16 contains a dichroic dye, the molecules of which are oriented by the LC molecules in order to control the degree of absorption of the cell. The cell thus operates in an absorption mode. The GH-LC cell 16 is pixellated, with each pixel being controlled by a pair of electrodes (not shown) in known manner.

The display 2 is viewed from the position of the viewer 20. The light reaching the viewer 20 from the display is a combination of light from the light source 4 and (usually white) ambient light reflected by the partially reflective mirror 10. It is for this reason that the display is referred to as transflective, because it operates on the basis of both transmission and reflection.

Figure 2:
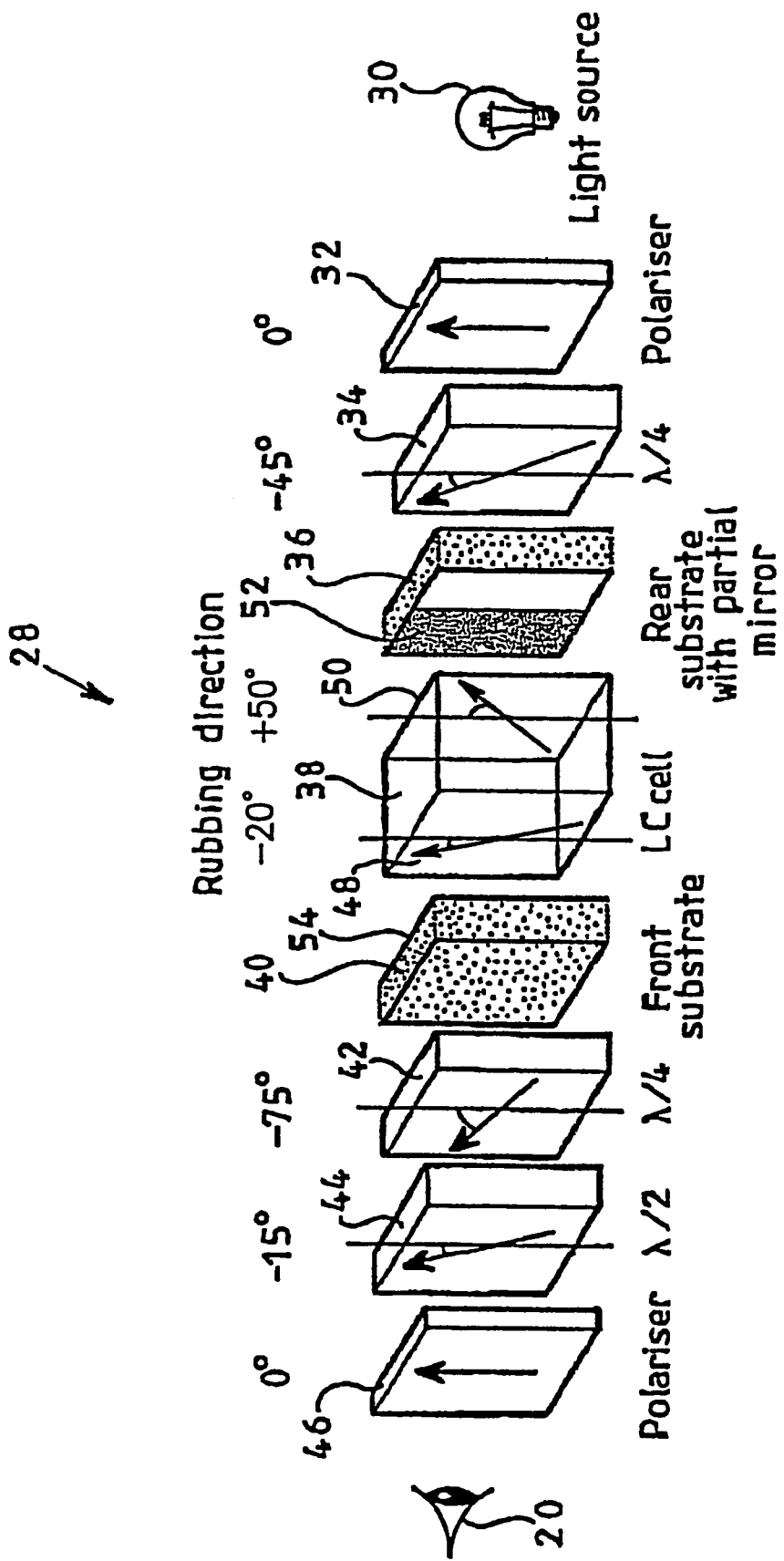
FIG. 2 is a schematic view of a transflective LCD according to a first embodiment of the invention.

The first embodiment of the invention, shown in FIG. 2, is a transflective liquid crystal display 28 comprising a light source 30, a rear polariser 32, rear quarterwave plate 34, rear substrate 36, liquid crystal cell 38, front substrate 40, front quarterwave plate 42, front halfwave plate 44, and front polariser 46. The location of the viewer 20 is also Indicated in FIG. 2.

The arrangement of components of the display 28 from the front polariser 46 to the rear substrate 36 (inclusive) is known from the Fujiwara reference mentioned above, except that the rear substrate 36 of the display 28 is provided with a partially reflecting (and partially transmitting) mirror (not shown separately) instead of a fully reflecting mirror.

FIG. 2 also Indicates for each of the retarders 34, 42 and 44, the angle that the slow axis of the retarder makes with respect to the angle of the absorption axes of the two polarisers 32 and 46 (which are parallel, and defined as 0 degrees). These angles are −45°, −75° and −15° respectively. In addition, the angles at which the LC molecules are aligned by alignment layers (not shown) at the surfaces 48 and 50 of the LC cell 38 are also indicated in FIG. 2. The surface director orientations (SDOs) are −20° and +50°, respectively. The term "surface director orientation" as used herein is defined as the orientation of the LC director at an alignment surface projected onto the plane of the alignment surface of the LC layer, so that the SDO is the orientation which the LC director would have in the absence of any surface pretilt. Also, the SDO is equivalent to (SDO±π). The twist of the LC layer may be between 30° and 100°, preferably between 60° and 80°.

The two transparent parallel substrates 36 and 40 are each coated on the inside surfaces 52 and 54 with a patterned conductor/electrode (not shown) for addressing the LC cell 38, with the rear electrode being patterned and partially transparent and partially reflecting. The ratio of transmission to reflection of the rear conductor/electrode may be 1:1 or any other pre-determined value according to the designated purpose of the transflective display 28. The electrodes are coated with alignment means and hold the nematic LC cell 38 continuously switchable between an effective retardation in the reflecting bright state of 80 nm to 200 nm, and preferably 135 nm, and in the dark state of 50 nm to 0 nm, and preferably close to 0 nm. The nematic LC may be twisted by surface alignment and/or chiral doping.

The outer sides of the substrates 36 and 40 are clad by the transparent retardation films 34, 42 and 44. The front halfwave retarder 44 has a retardation dΔn of substantially 270 nm and the front quarterwave retarder 42 has a retardation dΔn of substantially 133 nm, where d represents the thickness of the retarder film, and Δn represents the difference between the two refractive indices of the retarder film. The front quarterwave retarder 42 has its slow axis substantially parallel or normal to the bisetrix (ie. half the angle) of the (twist or) surface alignment directions of the nematic LC cell 38. (The angle −75° for the quarterwave retarder shown in FIG. 2 is normal to the bisetrix of the SDOs of −20° and +50° of the twisted nematic LC cell 38.). The two front retarders 42 and 44 form an achromatic combination retarder. The rear retarder 34 has a retardation dΔn of substantially 133 nm. The absorption or polarisation axis of the rear polariser 32 is at 45 degrees to the slow axis of the rear retardation film 34. The LC cell 38 may be MJ 96539 (Merck Japan), the retardation films 34, 42 and 44 of Nitto's NRZ range, and the polarisers 32 and 46 of Nitto's NPF range.

The bisetrix, or bisector, as used herein Is the direction which bisects the smaller included angle between two directions. The bisetrix Is also perpendicular to the optical axis of the device.

Figure 3:
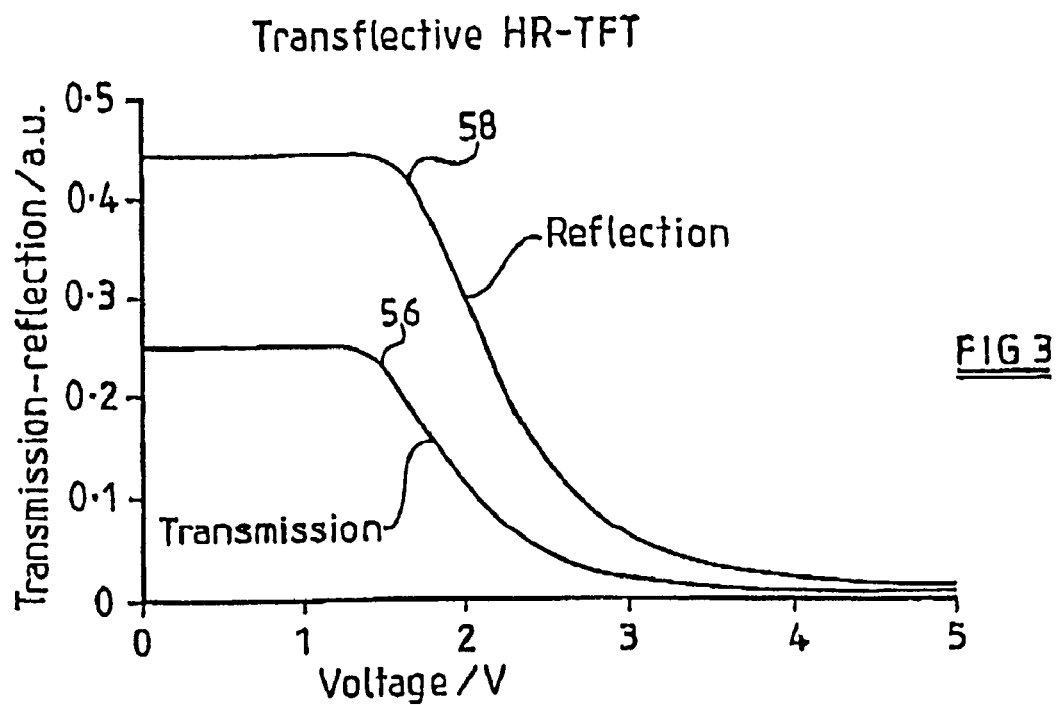
FIG. 3 shows the results of modelling the LC electrooptic response of the embodiment of FIG. 2.

FIG. 3 shows the results of computer modelling of the electrooptic response of the embodiment of FIG. 2. The modelling was carried out assuming a standardised D65 light source for reflected and transmitted light in the wavelength range of 380 to 780 nm. The design wavelength for optimum performance is 550 nm and matched to the eye's maximum sensitivity. The liquid crystal is MJ96539 with Δn=0.068539 at 550 nm, the LC layer thickness is set to 3.121 μm. The dispersion of the LC is taken into account, any dispersion in the retarders is neglected. The graph of FIG. 3 shows voltage (applied to a pixel of the LC cell 38) against transmission and reflection in arbitrary units. The transmission results are shown by curve 56, and the reflection results by curve 58. For the reflection results a 0.1 micron aluminium mirror is assumed, and for the transmission results the mirror was removed.

When no voltage is applied, both the transmission and reflection are high, and the display thus operates in a "normally white mode". The rear quarterwave plate 34 is necessary in order to ensure that the transmission curve 56 is the correct way around. Without the quarterwave plate 34 the transmission curve 56 would be low at zero volts and high at 5 volts. It will be seen from FIG. 3 that even at 4 or 5 volts there is still some residual transmission and reflection, which prevents the pixel from becoming fully dark. The embodiments discussed below seek to provide an improved contrast between the light and dark states.

Figure 3A:
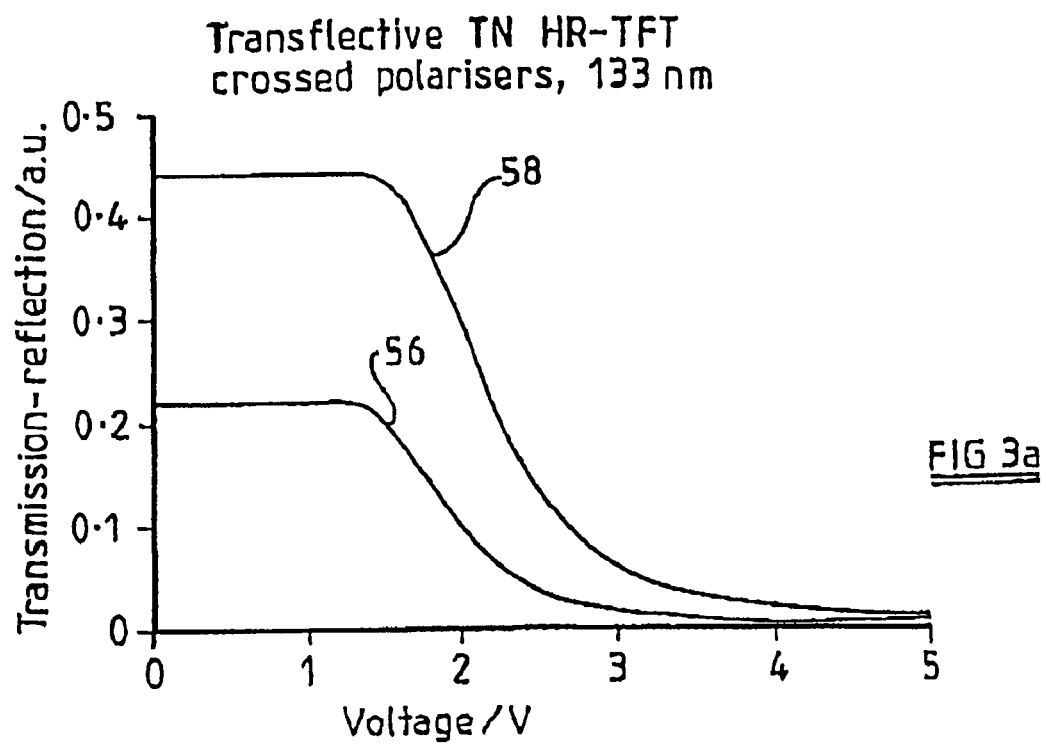
FIG. 3a shows the results of modeling the LC electrooptic response of the embodiment of FIG. 2, but using crossed polarisers.

FIG. 3*a* shows the results of modelling the LC electrooptic response of the embodiment of FIG. 2, but using crossed polarisers Instead of parallel polarisers. That is, to produce the results of FIG. 3*a*, the last two components (ie, the quarterwave plate 34 and polariser 32) are rotated through 90° compared to the arrangement shown in FIG. 2. This results in a better (ie, darker) dark state for the transmission curve 56. The reflection curve is again labelled 58.

Figure 4:
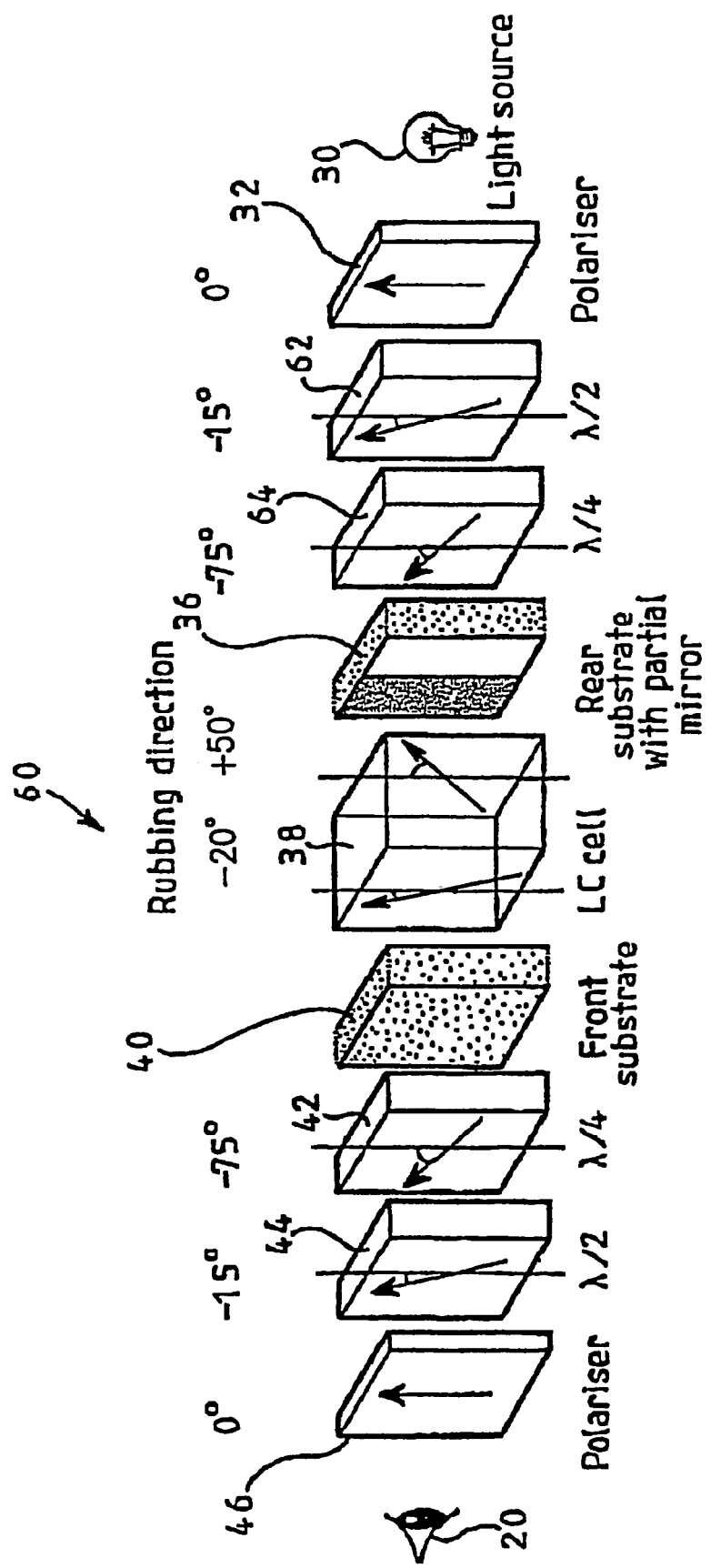
FIG. 4 is a schematic view of a transflective LCD according to a second embodiment of this invention.

FIG. 4 shows a second embodiment of the invention, which is a transflective display 60 providing reduced residual transmission in the dark state. Components which are the same as those of the first embodiment of FIG. 2 are given the same reference numerals. The display of FIG. 4 differs from that of FIG. 2 in that the rear quarterwave plate 34 is replaced by a rear halfwave plate 62 and a rear quarterwave plate 64, which have slow axes at −15° and −75° respectively with respect to the absorption axes of the two polarisers 32 and 46. As shown by FIG. 4, the components thus exhibit a degree of symmetry about the central LC cell 38. The combination of the rear halfwave plate and rear quarterwave plate improves the achromaticity of the transmission mode.

The effective retardation of the nematic LC cell 38 is continuously switchable between about 135 nm and 0 nm in the same way as in the embodiment of FIG. 2. The two front retarders 42 and 44 function together as an achromatic combination retarder, and the two rear retarders 62 and 64 also function together as an achromatic combination retarder. The retardation films can again be of Nitto's NRZ range.

Figure 5:
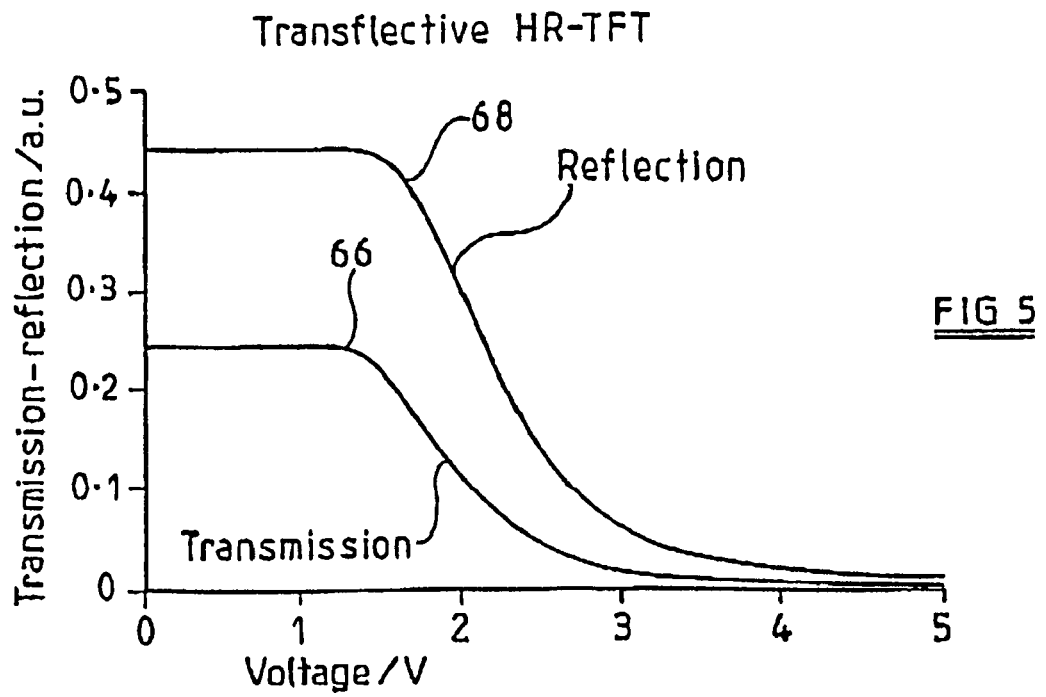
FIG. 5 shows the results of modelling the LC electrooptic response of the embodiment of FIG. 4.

FIG. 5 shows the results of computer modelling of the electrooptic response of the embodiment of FIG. 4. The transmission results are shown by curve 66, and the reflection results by curve 68. The assumptions mentioned above in relation to the graph of FIG. 3 apply equally to the FIG. 5. As shown by FIG. 5, the embodiment of FIG. 4 produces a slight reduction in the residual transmission (at around 4 to 5 volts) compared with the embodiment of FIG. 2.

Figure 6:
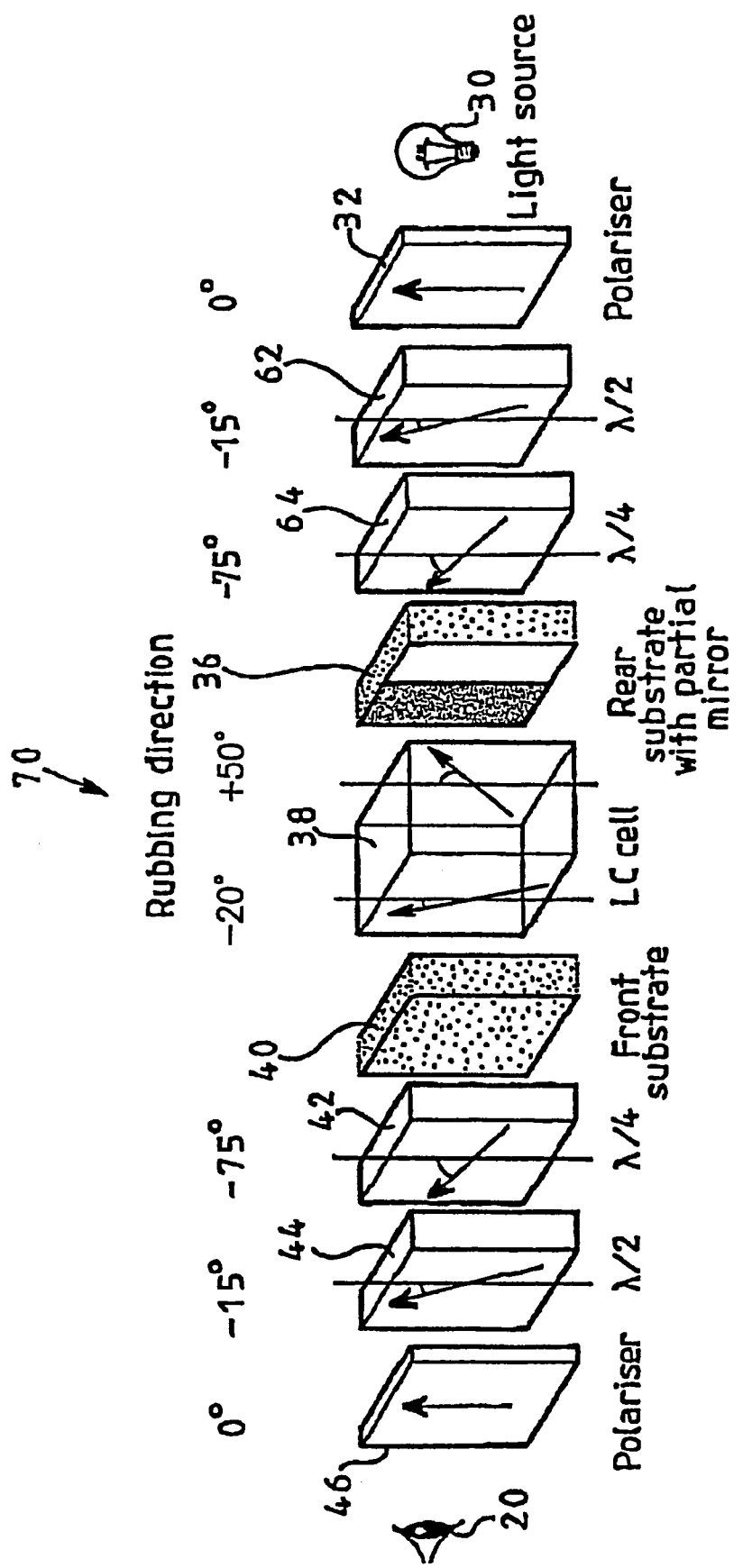
FIG. 6 is a schematic view of a transflective LCD according to a third embodiment of this invention.

FIG. 6 shows a third embodiment of the invention, which is a transflective display 70 providing both significantly reduced residual transmission and significantly reduced residual reflection. The components are essentially the same as those of the embodiment of FIG. 4, and the same reference numerals are therefore used. However, the display 70 differs from that of FIG. 4 in that the thickness of the front quarterwave plate (retarder) 42 is increased so that it has a retardation dΔn of substantially 150 nm.

The front and rear quarterwave plates 42 and 64 have their slow axes substantially normal to the bisetrix of the surface director orientations of the nematic LC cell 38. The two front retarders 42 and 44, and the two rear retarders 62 and 64, each form an achromatic combination retarder. The front achromatic combination retarder is modified to compensate for the residual retardation of the LC cell at finite voltages. The retardation of quarterwave plate 42 is Increased when the slow axis of each quarterwave plate is normal to the bisetrix of the SDOs of the nematic LC cell 38. Alternatively, if the slow axes of the quarterwave plates 42 and 64 are parallel to the bisetrix of the SDOs of the nematic LC cell 38, the retardation of quarterwave plate 42 needs to be decreased. The retardation films can again be of Nitto's NRZ range.

Figure 7:
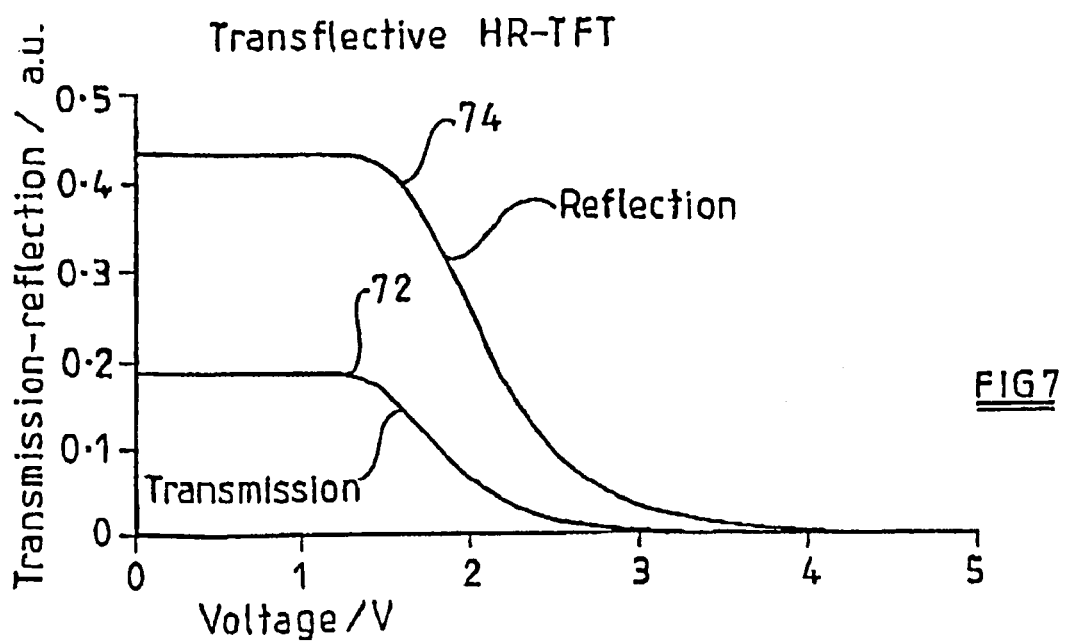
FIG. 7 shows the results of modelling the LC electrooptic response of the embodiment of FIG. 6.

FIG. 7 shows the results of computer modelling of the electrooptic response of the embodiment of FIG. 6. The transmission results are shown by curve 72, and the reflection results by curve 74. The assumptions mentioned above in relation to the graph of FIG. 3 apply equally to the FIG. 7. As shown by FIG. 7, the embodiment of FIG. 6 produces a significant reduction in both the residual transmission and the residual reflection in the dark state (at around 4 to 5 volts) compared with the previous embodiments.

This improvement comes about because the increased thickness of the quarterwave plate 42 compensates for the residual retardation caused by the fact that those liquid crystal molecules in the LC cell 38 which lie close to the alignment layers (not shown separately) remain, "fixed" in position when the LC cell 38 is switched by application of an external voltage.

Figure 7A:
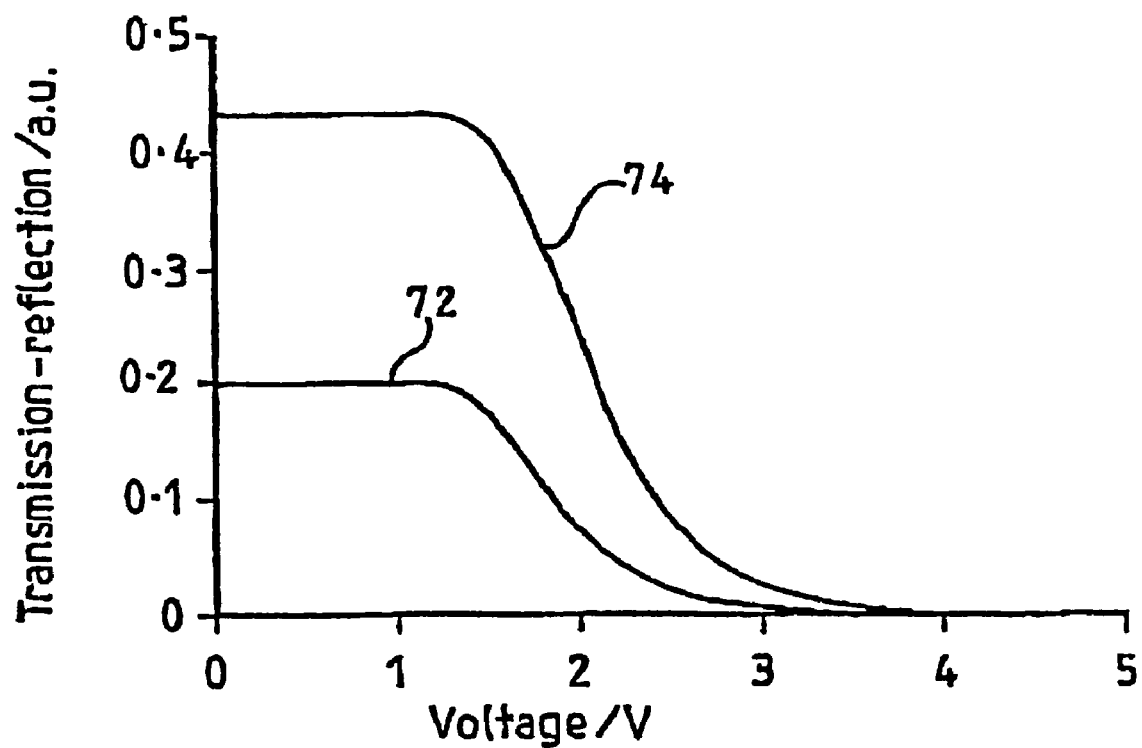
FIG. 7a shows the results of modelling the LC electrooptic response of the embodiment of FIG. 6, but using crossed polarisers.

FIG. 7a uses the same reference numbers as FIG. 7, and shows an improved (ie. darker) dark state and increased bright state for the transmission curve 56, achieved by rotating the last three components (ie. 32, 62 and 64) of FIG. 6 through 90°, so that the polarisers 32 and 46 are crossed.

Figure 8:
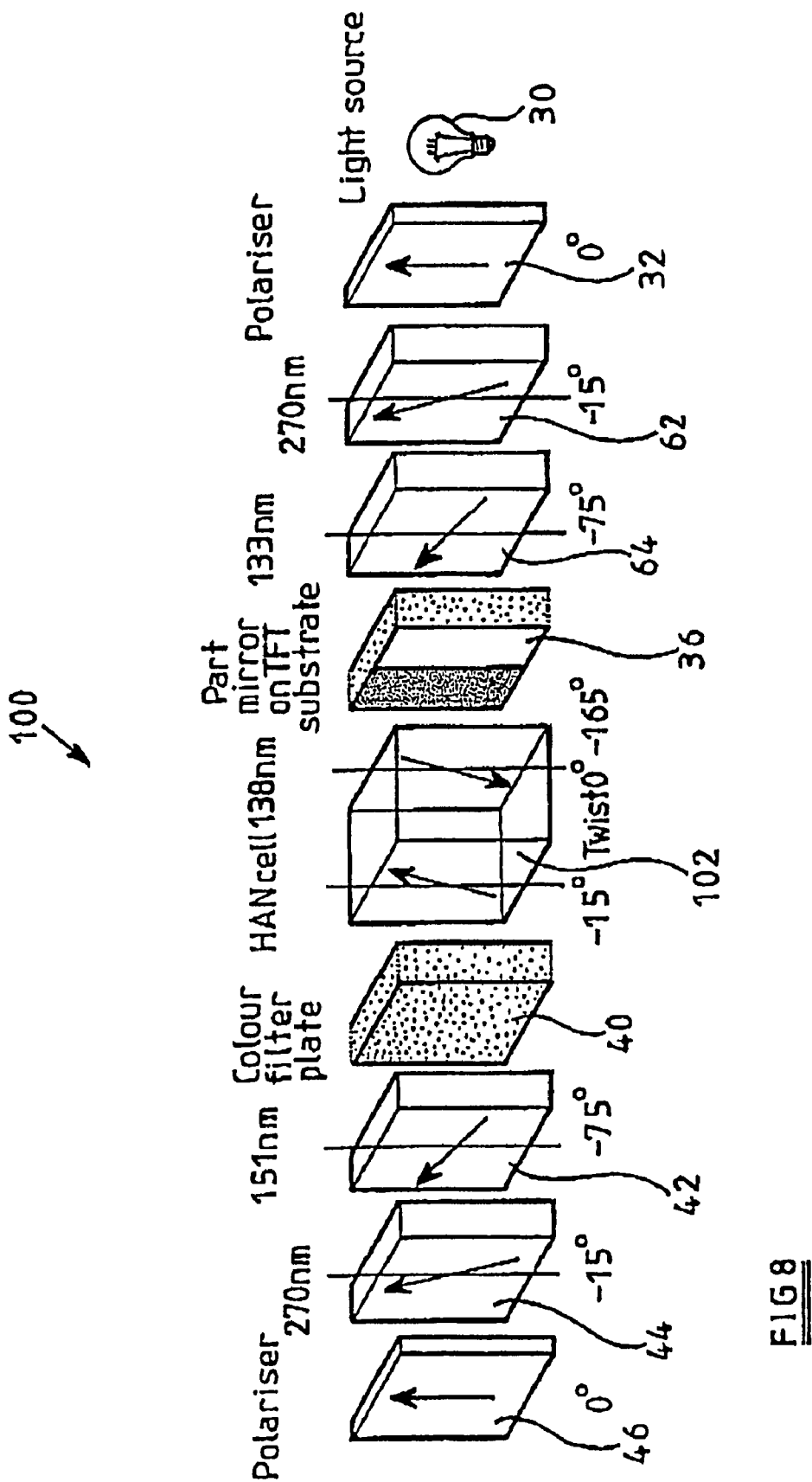
FIG. 8 is a schematic view of a transflective LCD according to a fourth embodiment of this invention.

FIG. 8 shows a fourth embodiment of the invention The components of the transflective display 100 are essentially the same as those of the embodiments of FIGS. 4 and 6, and the same reference numerals are therefore used for components which are the same. However, the nematic LC cell 38 of FIGS. 4 and 6 is replaced by a hybrid aligned nematic (HAN) LC cell 102. The cell 102 used is LC MJ96539 produced by Merck Japan and has antiparallel surface director orientation with surface pretilt of 2° and 88°, respectively, and a retardation of substantially 137.5 nm. The orientations and retardations of the other components are given in FIG. 8. The front substrate 40 also functions as a colour filter plate. The retardation of the front quarterwave plate 42 is 150 nm.

Figure 9:
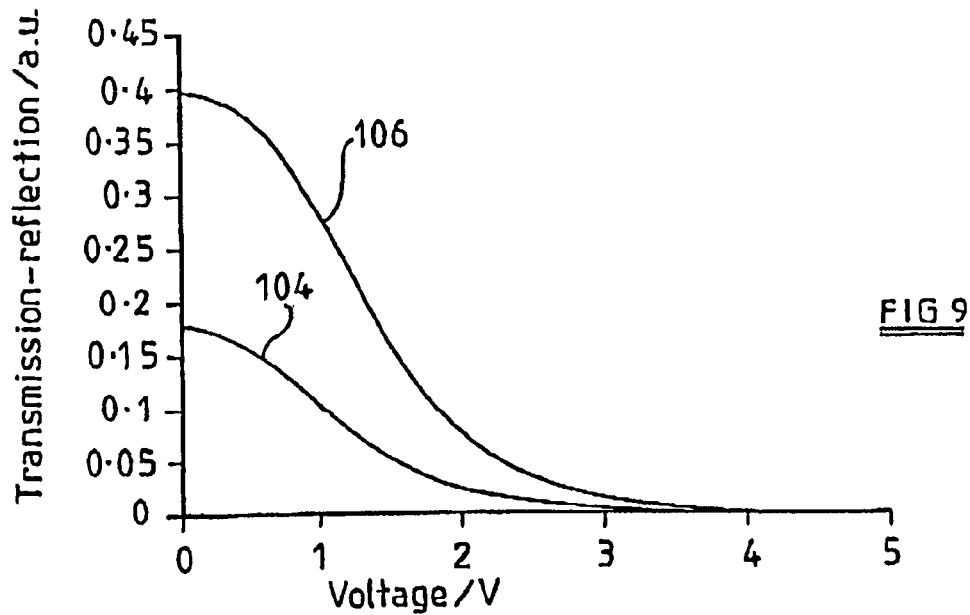
FIG. 9 shows the results of modelling the LC electrooptic response of the embodiment of FIG. 8.

FIG. 9 shows the results of computer modelling of the electrooptic response of the embodiment of FIG. 8. The transmission results are shown by curve 104, and the reflection results by curve 106.

Figure 9A:
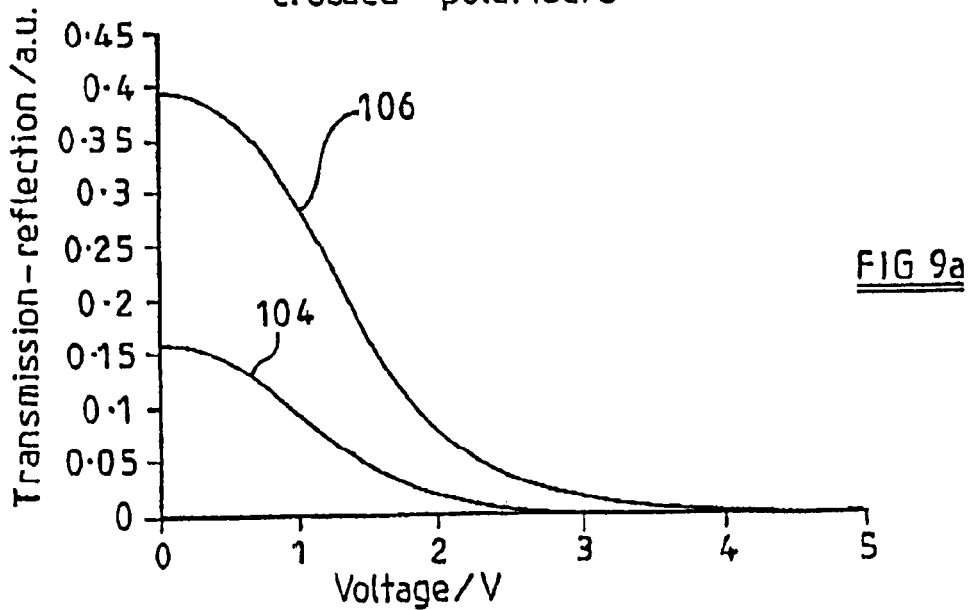

FIG. 9a uses the same reference numbers as FIG. 9, and shows an improved (ie. darker) dark state for the transmission curve 104, achieved by rotating the last three components (ie. 32, 62 and 64) of FIG. 8 through 90°, so that the polarisers 32 and 46 are crossed.

In any of the embodiments of the invention the partially reflective (and partially transmissive) mirror (not shown separately) provided on the rear substrate 36 can be either a mirror containing a number of gaps or holes, or a continuous mirror which is transparent to a predetermined value of say between 10% and 90%.

FIG. 10 shows the layout of the prior art reflective LCD 76 described in the paper by S. Fujiwara mentioned above. From top to bottom, the display 76 comprises a polariser 78, one or more retardation films 80, micro colour filters 82, a front substrate 84, a liquid crystal layer 86 (represented schematically by liquid crystal molecules 87, reflective electrodes 88 controlled by thin film transistor (TFT) elements 90, and a rear substrate 92. Three colour filters 82, representing red, blue and green, are shown in FIG. 10, each covering two reflective electrodes 88. Each electrode 88 corresponds to a subpixel. FIG. 10 thus shows two pixels, each comprising three subpixels having red, blue and green filters. The liquid crystal molecules 87 located under the green filter 82 are shown switched, whereas the other liquid crystal molecules 87 are shown unswitched.

FIG. 11 shows the layout of a transflective LCD in accordance with the invention. Where components correspond to those in FIG. 10 the same reference numerals are used. The arrangement of FIG. 11 differs from that of FIG. 10 by the addition of one or more retardation films 92, a rear polariser 94, and a backlight 96. In addition the reflecting electrodes 88 are made partially transmissive by providing the electrodes 88 with apertures 98. As an alternative, the electrodes 88 can be made of a continuous partially transmissive material.

In any embodiment the red, green and blue voltage levels can be individually adjusted for transmission, transflective or reflection modes. The transmission/reflection against voltage curve is wavelength dependent and can be different between the reflective and the transmissive mode. Hence data voltages must be adjusted according to the mode used.

Each micro colour filter 82 can have areas of different absorption to achieve the best colour balance/saturation for transmission and reflection modes.

The invention can use LC modes switching substantially in the plane of the LC cell, so-called in-plane switching modes, found for example in ferroelectric, antiferroelectric and some nematic LC modes. The invention can also use out-of-plane switching modes, and is not limited to twisted nematics. For example, surface switching LC modes can be used.

Retardation values, twist angles, and other orientation angles given for the embodiments described above are examples only.

Embodiments of a second aspect of the invention will now be described.

Figure 12:
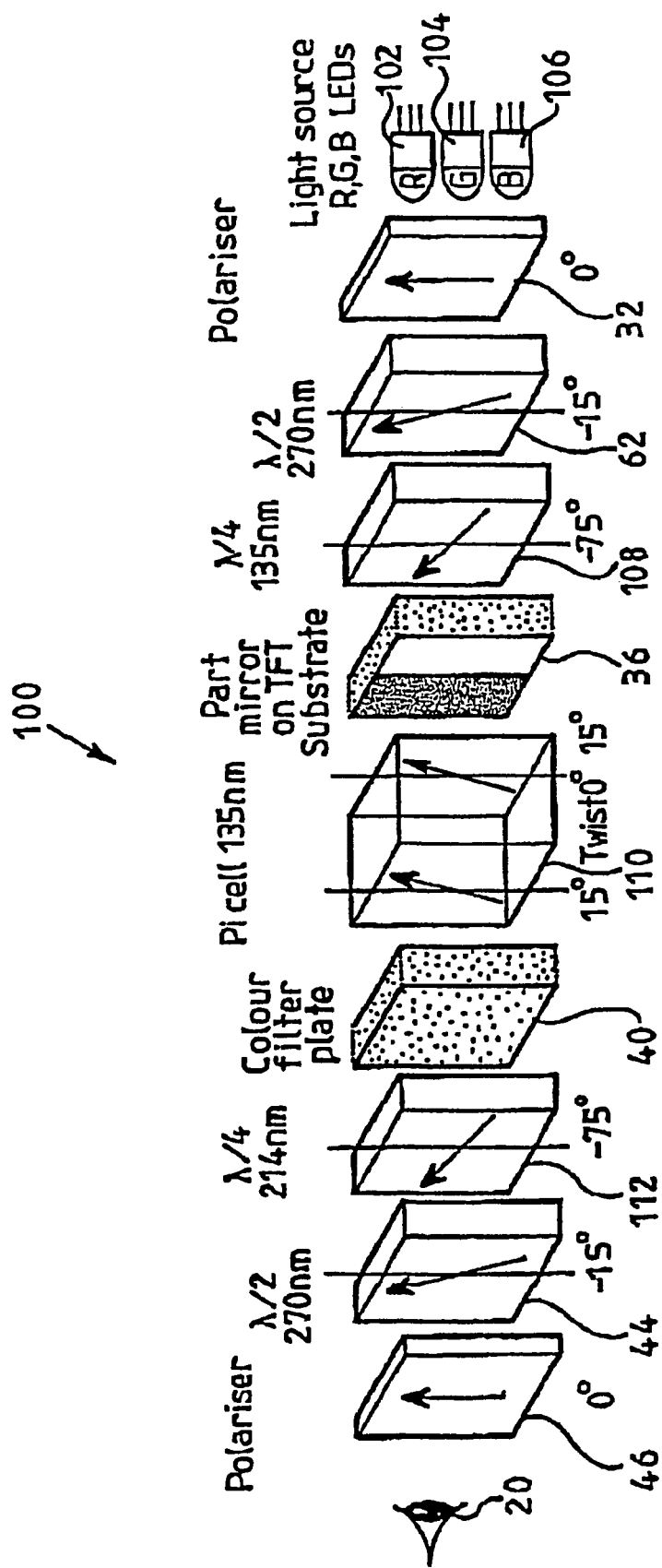
FIG. 12 shows a transflective LCD using a Pi or OCB cell, which is an embodiment of a second aspect of the invention.

FIG. 12 shows a transfective LCD 100 which is capable of time sequential colour illumination. Components which are the same as those in FIG. 9 are given the same reference numerals. The transflective LCD 100 comprises: three flashing LEDs, which are red 102, green 104 and blue 106, a rear polariser 32, a rear halfwave plate 62, a rear quarterwave plate 108, a rear substrate 36 provided with a partially reflecting mirror, a Pi or OCB cell 110 formed from the LC material TL203 made by Merck, a front substrate 40 provided with colour filters, a front quarterwave plate 112, a front halfwave plate 44 and a front polariser 46. The front quarterwave plate 112 has a retardation of 214 nm. The increased retardation of the front quarterwave plate 112 is required to compensate for the larger residual retardation of the Pi cell at finite voltages compared to the HAN and TN cell.

The angles which the slow axes of the retarders 62, 108, 112 and 44 make with respect to the absorption axes of the two polarisers 32 and 46 (defined as 0 degrees) are indicated in FIG. 12, together with the retardation values of the retarders. FIG. 12 also shows that the Pi cell 110 has zero twist.

The embodiment of FIG. 12 also makes use of micro colour filters 82, as shown in FIG. 11. When the ambient light level is low, the transflective LCD 100 switches (either automatically or manually) to a time sequential transmission mode in which the red, green and blue LEDs 102, 104 and 106 flash in turn. The pixels of the Pi cell 110 are addressed for each flash. This is why it is desirable to use a Pi cell rather than a TN LC cell, because a Pi cell can be switched more quickly.

It is possible to address the pixels of the Pi cell 110 in different ways. In the simplest case, when the green LED 104 is flashed, only the pixels with green micro colour filters 82 are switched on, and the other pixels are switched off (ie. to a zero transmission state).

However, if the micro colour filters 82 are sufficiently wide band, then each colour filter 82 will let through some light of each other colour. For example, the green filters which let through some red and blue light. In this case, it is possible to make use of all of the pixels for all of the coloured LEDs, provided that the transmission characteristics of the micro colour filters 82 are taken into account when addressing the pixels. In this way it is possible to increase both the light throughput and the resolution of the display, because when the green LED 104 is flashed, for example, light can pass through pixels having micro colour filters 82 of any colour.

It is still necessary to retain the micro colour filters 82 to allow the LCD to operate in a reflective mode when the ambient light level is sufficiently high, and therefore reduce the power consumption of the device.

A difficulty with the earlier embodiments (FIGS. 2, 4, 6 and 8), can be understood by considering FIG. 11. Reflected light must make two passes through the colour filters 82, whereas (white) light transmitted from the backlight 96 makes only a single pass through each colour filter 82. In order to achieve a satisfactory brightness level in reflection it is necessary to use wide band colour filters 82, which let through a wide range of light frequencies. However, this results in a lower colour saturation. That is, reflected light from the LCD appears whiter in colour to the observer 20. The problem is worse for transmission, because transmitted light makes only a single pass through the colour filters 82, and the colour saturation is therefore lower.

The light throughput and high resolution capability in the transmissive mode can be improved in the following way. Instead of coating each micro colour filter 82 continuously and evenly over the pixel area, each micro colour filter 82 can be provided with a transparent region, and the remainder of the area of the micro colour filter 82 can be made more absorbing (ie. more narrow band). For example, for the green micro colour filters 82, the remainder of the micro colour filter 82 can be made more green, so that in the reflective mode no change is perceived by the observer 20 because the transparent region is compensated for by the "more green" region. The same can be done for the red and blue micro colour filters 82. An advantage is achieved in the transmission mode because the transparent regions transmit light of any colour, and thus every micro colour filter 82 is better adapted to transmit light from any of the coloured LEDs 102, 104 and 106.

If the liquid crystal is provided with partially reflecting electrodes having transmissive areas, the transmissive areas can be optically aligned with said transparent regions. A black and white (greyscales) embodiment is also possible, which does not use differently coloured filters and backlights.

Figure 13:
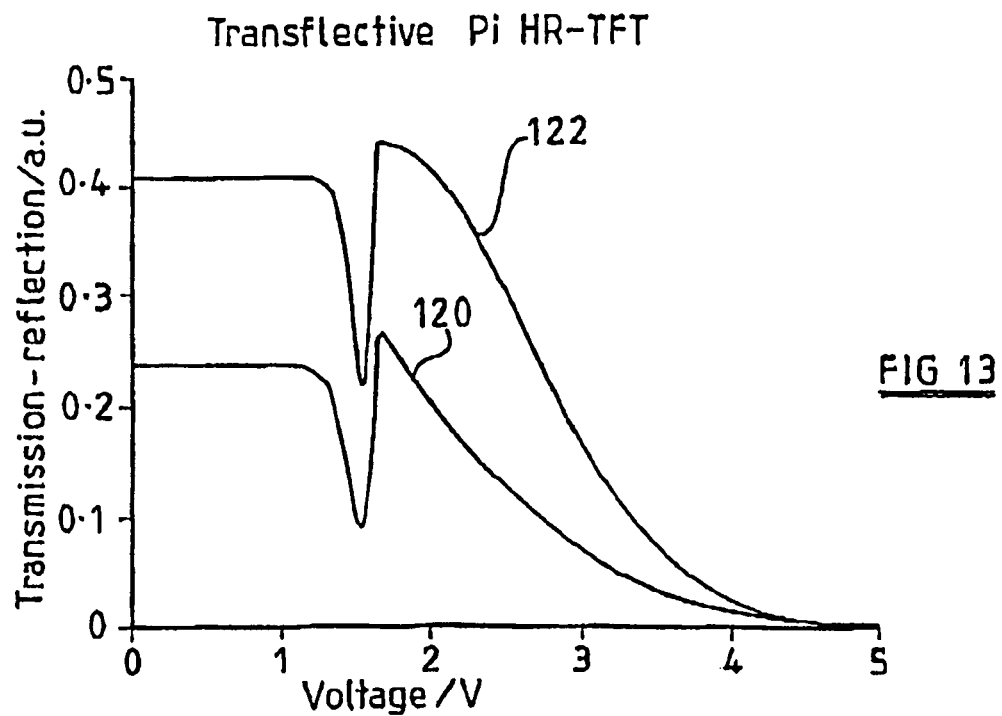
FIG. 13 shows the results of modelling the LC electrooptic response of the embodiment of FIG. 12.

FIG. 13 shows the electrooptic response of the embodiment of FIG. 12. The transmission results are shown by curve 120, and the reflection results by curve 122. The results below about 1.6V are not useful, as the liquid crystal cannot be used for fast switching in this region. The display 100 should therefore be used in the range 1.6V to 5V.

Figure 14:
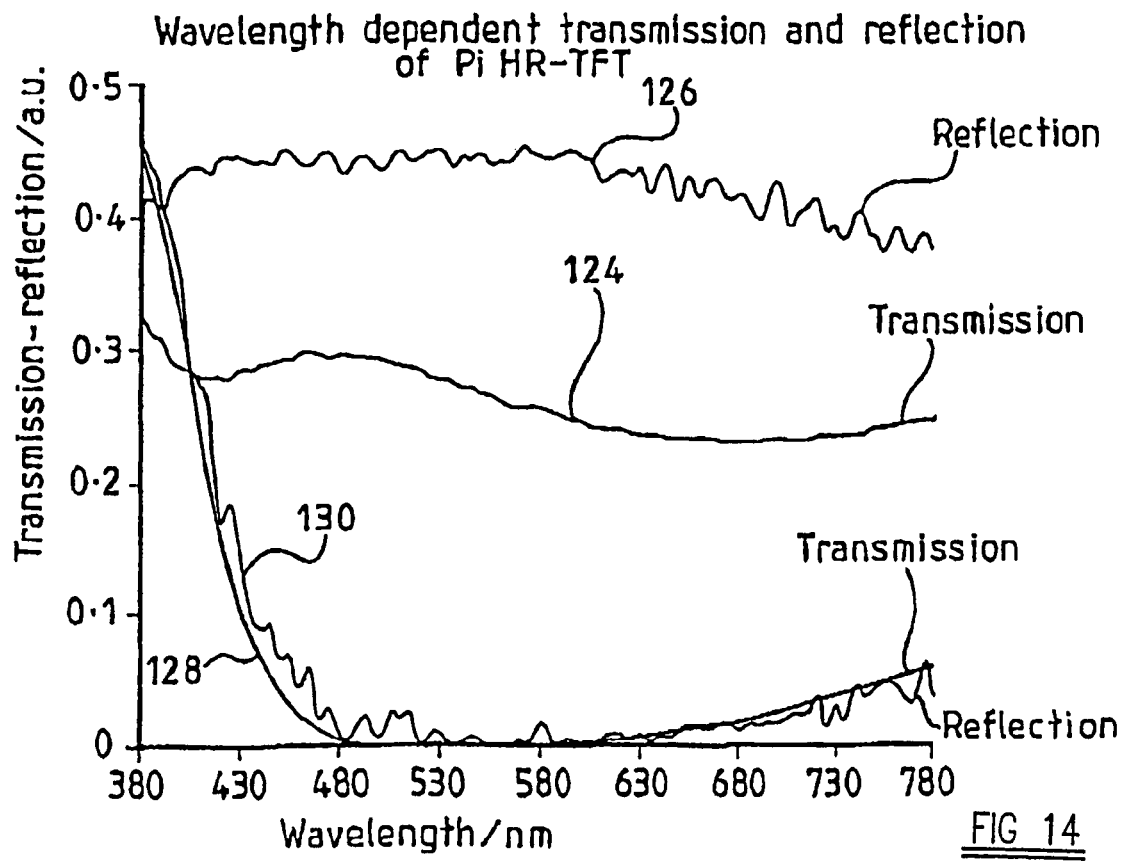
FIG. 14 shows the results of modelling of the LC electrooptic response of the embodiment of FIG. 12, and shows the wavelength dependence of the electrooptic response for transmission and reflection in both the switched and unswitched states.

FIG. 14 chows the wavelength dependence of the electrooptic response of the embodiment of FIG. 12. The transmission and reflection results when the display 100 is switched to the "on" state are shown by curves 124 and 126 respectively. The transmission and reflection results when the display 100 is switched to the "off" state are shown by curves 128 and 130 respectively. It will be seen from these results that the wavelength dependence is reasonably flat over the wavelengths of interest (ie from blue to red).

It should be appreciated that whilst the second aspect of the invention, relating to a time sequential transflective display using differently coloured flashing backlights can be used in conjunction with the first aspect of the invention, it is not so limited In particular, the second aspect of the invention can be used with any transfective display.

The invention claimed is:

1. A transflective display, comprising:
   a liquid crystal divided into a plurality of pixels,
   addressing means for addressing each pixel and switching each pixel between different states resulting in different levels of transmission of light through the display,
   a flashing backlight located behind the liquid crystal, and
   a partially reflective mirror located between the liquid crystal and a rear polariser for both reflecting ambient light back through the liquid crystal and allowing transmission of light from the backlight through the liquid crystal,
   wherein each pixel is provided with a light filter,
   the flashing backlight comprises a plurality of sequentially flashing light sources,
   the liquid crystal is disposed between a front substrate and a rear substrate,
   a front polariser is located in front of the front substrate,
   the rear polariser is located behind the rear substrate, and
   the rear substrate is provided with the partially reflective mirror.

2. A transflective display as claimed in claim 1, wherein each light filter is a colour light filter, and wherein said sequentially flashing light sources are of different colours.

3. A transflective display as claimed in claim 2, wherein said liquid crystal is part of an active matrix display.

4. A transflective display as claimed in claim 1, wherein the liquid crystal forms a Pi or OCB cell.

5. A transflective display as claimed in claim 1, wherein each said sequentially flashing light source is a light emitting diode (LED).

6. A transflective display as claimed in claim 2, wherein each colour filter provides a varying level of absorption across its area.

7. A transflective display as claimed in claim 6, wherein each colour filter has a transparent region.

8. A transflective display as claimed in claim 7, wherein said liquid crystal is provided with a plurality of partially reflective electrodes each having a light transmissive area, and wherein each said transmissive area is optically aligned with a transparent region of one of said colour filters.

9. A transflective display as claimed in claim 1, wherein said partially reflective mirror comprises a plurality of gaps or holes.

10. A transflective display as claimed in claim 1, wherein said partially reflective mirror is a mirror transparent to a predetermined value between 10 and 90%.

11. A transflective display as claimed in claim 2, wherein for transmission, transflective and reflection modes of the transflective display a voltage level for each said different colour is individually adjusted.

12. A transflective display as claimed in claim 1, in which an effective retardation of the nematic LC is continuously switchable, and two front retarders function together as an achromatic combination retarder.

13. A transflective display as claimed in claim 1, in which an effective retardation of the LC is continuously switchable, and two rear retarders function together as an achromatic combination retarder.

14. A transflective display as claimed in claim 1, in which the LC has antiparallel surface director orientation with surface pretilt, and a front substrate functions as a colour filter plate.

15. A transflective display as claimed in claim 11, in which the voltage level for each said different colour are individually adjusted for transmission, transflective or reflection modes, and a transmission/reflection against voltage curve is wavelength dependent and is different between the reflective and the transmissive mode.

16. A transflective display as claimed in claim 1, in which the LC has substantially parallel surface director orientations.

17. A transflective display as claimed in claim 16, in which the LC is formed from a Pi cell.

18. A transflective display as claimed in claim 12, in which the LC is a nematic LC.

19. A transflective display as claimed in claim 15, in which the different colours are red, green and blue.

* * * * *